(12) United States Patent
Wang et al.

(10) Patent No.: US 10,403,439 B2
(45) Date of Patent: Sep. 3, 2019

(54) MULTILAYER CAPACITOR

(71) Applicant: Palo Alto Research Center Incorporated, Palo Alto, CA (US)

(72) Inventors: Yunda Wang, Milpitas, CA (US); David E. Schwartz, San Carlos, CA (US); Rene A. Lujan, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 75 days.

(21) Appl. No.: 14/976,222

(22) Filed: Dec. 21, 2015

(65) Prior Publication Data

US 2017/0178819 A1 Jun. 22, 2017

(51) Int. Cl.
*H01G 4/38* (2006.01)
*H01G 4/30* (2006.01)
*H01G 4/12* (2006.01)
*H01G 4/232* (2006.01)

(52) U.S. Cl.
CPC .............. *H01G 4/385* (2013.01); *H01G 4/30* (2013.01); *H01G 4/38* (2013.01); *H01G 4/12* (2013.01); *H01G 4/232* (2013.01)

(58) Field of Classification Search
CPC .......... H01G 4/30; H01G 4/005; H01G 4/008; H01G 4/012; H01G 4/228; H01G 4/38; H01G 4/385
See application file for complete search history.

(56) References Cited

U.S. PATENT DOCUMENTS

| | | | |
|---|---|---|---|
| 4,064,606 A * | 12/1977 | Dunn | H01G 4/232 264/221 |
| 5,587,869 A * | 12/1996 | Azumi | H01G 4/224 361/301.3 |
| 6,877,325 B1 | 4/2005 | Lawless | |
| 7,035,079 B1 | 4/2006 | Park et al. | |
| 7,602,601 B2 | 10/2009 | Togashi | |
| 7,623,337 B2 | 11/2009 | Togashi | |
| 8,575,494 B2 | 11/2013 | Tien | |
| 8,601,658 B2 | 12/2013 | Bulovic et al. | |
| 8,885,323 B2 | 11/2014 | Hwang et al. | |
| 9,761,375 B2 * | 9/2017 | Dooley | H01G 4/30 |
| 2003/0072125 A1 * | 4/2003 | Galvagni | H01G 2/00 361/306.3 |
| 2006/0198079 A1 * | 9/2006 | Shim | H01G 2/06 361/306.3 |
| 2010/0146778 A1 * | 6/2010 | Dooka | H01G 4/232 29/832 |
| 2014/0126111 A1 | 5/2014 | Kim et al. | |
| 2015/0022847 A1 * | 1/2015 | Nishida | G06F 3/1238 358/1.14 |

(Continued)

*Primary Examiner* — Nguyen T Ha
(74) *Attorney, Agent, or Firm* — Hollingsworth Davis, LLC

(57) ABSTRACT

A capacitor device includes a plurality of capacitors arranged into a shape. Each capacitor of the plurality of capacitors has a first external electrode on a first side of the capacitor and a second external electrode on a second side of the capacitor opposing the first side. A first plate is proximate and electrically coupled to the first external electrodes of the capacitors. A second plate is proximate and electrically coupled to the second external electrodes of the capacitors.

21 Claims, 10 Drawing Sheets

(56) References Cited

U.S. PATENT DOCUMENTS

2015/0022947 A1* 1/2015 Rastegar .................. H01G 4/33
    361/301.4
2015/0371778 A1* 12/2015 Engel ..................... H01G 4/224
    361/301.4

* cited by examiner

MULTILAYER CAPACITOR

TECHNICAL FIELD

This disclosure relates generally to capacitor devices and to systems and methods related to such devices.

BACKGROUND

In recent years, several technologies have been investigated for heat pump, air conditioning, and/or other energy conversion applications. These technologies include the use of electrocaloric energy conversion which may lead to enhanced energy efficiency, compactness, noise level, as well as a reduction in environmental impact.

BRIEF SUMMARY

A capacitor device comprises a plurality of capacitors arranged into a shape. Each capacitor of the plurality of capacitors has a first external electrode on a first side of the capacitor and a second external electrode on a second side of the capacitor opposing the first side. A first plate is proximate and electrically coupled to the first external electrodes of the capacitors. A second plate is proximate and electrically coupled to the second external electrodes of the capacitors.

A method involves arranging capacitors proximate a first plate so that first external electrodes of the capacitors face a surface of the first plate. The first external electrodes of the capacitors are electrically connected to the first plate. The capacitors are mechanically coupled to the first plate. A second plate is arranged proximate second external electrodes of the capacitors so that the second external electrodes of the capacitors face a surface of the second plate. The second external electrodes of the capacitors are electrically connected to the second plate. The capacitors are mechanically coupled to the second plate.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Aspects described herein relate to the structure, design, and fabrication of capacitor devices constructed from an array of capacitors. The capacitors in the array of capacitors may be of any type. For example, the array of capacitors may comprise multilayer capacitors (MLCs) and/or multilayer ceramic capacitors (MLCCs). Constructing a module from an array of capacitors electrically connected in parallel and/or series allows a capacitor to be built with arbitrary size, geometry, and capacitance value. Such a capacitor device can be constructed from inexpensive, commercially-produced components and can be useful in many applications.

As one example, a modular type of capacitor design can be useful in electrocaloric cooling systems such as in refrigerators, heat pumps, and/or other coolers. The electrocaloric effect refers to a temperature and/or entropy change of a dielectric material upon application of an electric field. Materials such as polymers, bulk ceramics, thin-film ceramics, and other materials have exhibited an electrocaloric effect. Capacitors that are used in an electrocaloric system can include electrocaloric dielectric materials such as ceramics including $BaTiO_3$, lanthanated lead zirconate titanate (PLZT), and/or $PbBaZrO_3$, polymers, including poly(vinyledene fluoride-trifluoroethylene-) (P(VDF-TrFE)) copolymer or poly(vinyledene fluoride-trifluoroethylene-chlorofluoroethylene) (P(VDF-TrFE-CFE)) terpolymer, and/or polymer-ceramic composites.

As another example, capacitor modules described herein can be capable of exhibiting a pyroelectric effect. The pyroelectric effect, the converse of the electrocaloric effect, refers to the change in the surface charge on a capacitor in response to a temperature change. Capacitor modules that exhibit the pyroelectric effect are useful for implementing a heat engine and/or a temperature sensor.

Figure 1:
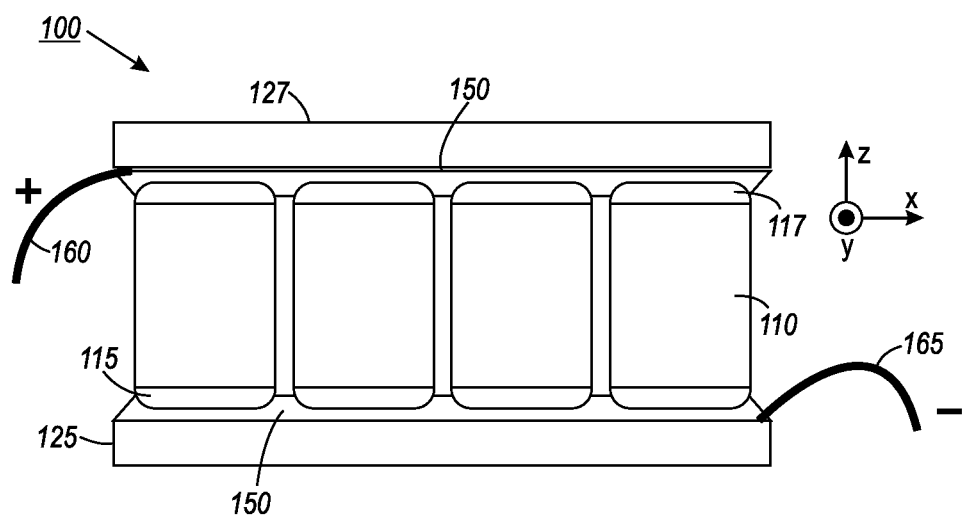
FIG. 1 illustrates an arrangement of capacitors having two plates in accordance with embodiments described herein.

FIG. 1 illustrates a capacitor device 100 comprising an arrangement of capacitors 110, e.g., multi-layer chip capacitors, in accordance with embodiments described herein. While FIG. 1 shows a parallel arrangement having four capacitors, it is to be understood that the arrangement can comprise more or fewer capacitors and that the capacitors can be electrically connected in parallel and/or in series. Each of the capacitors 110 has a first external electrode 115 and a second external electrode 117. The first external electrodes 115 and the second external electrodes 117 may be electrically connected to internal electrodes (not shown) of the capacitors 110. The first external electrodes 115 are proximate a first plate 125 and the second external electrodes 117 are proximate a second plate 127. The first 125 and second plates 127 may have a high thermal conductivity that facilitates heat spreading, e.g. a thermal conductivity greater than 10 W/m-K, and/or greater than 100 W/m-K. The first 115 and second 117 external electrodes may be electrically connected to the respective first 125 and second 127 plates. In some embodiments, each electrode plate 125, 127 is coated with an electrically conductive metal such that its surface is electrically conductive. In some cases, the electrode plates themselves may be electrically conductive without the metal layer. For example, the electrode plates may be at least partially made from an electrically conductive material such as copper and/or aluminum. In other embodiments, they may be at least partially made from a semiconducting material such as silicon, or an insulating material, such as alumina.

According to various implementations, first external electrodes 115 may be electrically connected and/or mechanically attached to the first plate 125 and the second electrodes 117 may be electrically connected and/or mechanically attached to the second plate 127 by a solder and/or an adhesive layer 150. Solder and types of electrically-conductive epoxies have a relatively high thermal conductivity that can enhance heat transfer. The solder and/or adhesive layer 150 may provide electrical contact between the capacitors 110 and the plates 125, 127. The plates 125, 127 provide the ability to connect the capacitors 110 in parallel without individually wiring the capacitors 110 to each other. This parallel connection of multiple capacitors facilitates the formation of a large single capacitor where the first plate acts as a first device electrode and the second plate acts as a second device electrode of the multi-capacitor device 100. Since the electrode plates are electrically conductive or coated with an electrical conductor, when electrically attached to the plates, the capacitors are electrically connected in parallel, with the plates serving as electrodes of a multi-capacitor device. The conductive plate, metal layer and/or solder electrically connect individual capacitors to the electrode plates. The plates 125, 127 may be rigid with flat surfaces to facilitate reducing contact thermal resistance when stacking capacitor devices 100 or attaching capacitor devices 100 to other components in a system where low contact thermal resistances are desired. Rigidity and flatness facilitate using a thin thermal interface layer (e.g., thermal grease, thermal epoxy, etc.) with a low thermal conductance between devices.

In some embodiments, one or more alignment features may be disposed on surfaces of one or both of the plates. The alignment features facilitate positioning the capacitors on the plate. For example, the alignment features may be made of the same material as the plate in some embodiments.

The multi-capacitor device 100 may include wires 160, 165 that can be used to connect the multi-capacitor device 100 to other devices. For example, in some embodiments, another layer of capacitors, e.g., parallel connected capacitors, may be connected in series or parallel with the arrangement 100 shown in FIG. 1. The multi-capacitor device 100 may be connected via the wires 160, 165 to other circuit components, a circuit board, and/or a power source, for example.

In an electrocaloric cooling system, the capacitors may have a dielectric with the electrocaloric effect, as described above. When an electrical potential is applied and removed across such a capacitor, via the electrode plates, the capacitors increase or decrease in temperature or entropy as a unit. According to embodiments described herein, an electrocaloric capacitor arrangement comprises a combination of active and inactive material. The active material is the electrocaloric dielectric, which intrinsically changes temperature upon application of an electric field. The inactive material comprises the electrode metal, electrode plates, package materials, and all other parts that do not have an electrocaloric effect or otherwise do not undergo an electrocaloric temperature change in operation. The performance of some electrocaloric cooling systems, including a heat-switch-based electrocaloric cooler, is a function in part of the ratio of the thermal masses of the active and inactive materials, and, in particular, is generally higher with a high ratio. The electrode plates can be very thin, especially if composed of a strong, flat material such as silicon. The solder reflow process allows for a very thin bonding layer. These characteristics allow for a small added thermal mass and that increase the electrocaloric effect.

Figure 2:
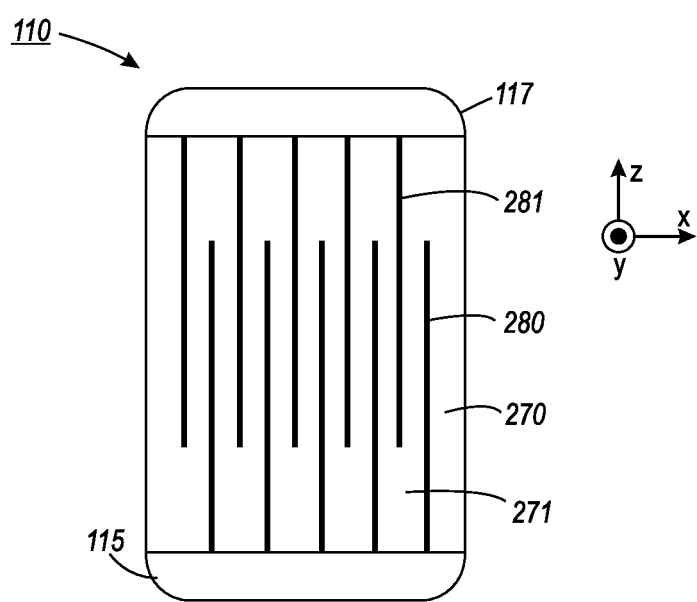
FIG. 2 illustrates a more detailed cross-sectional view of one of the multi-layer capacitors shown in FIG. 1 according to some embodiments.

FIG. 2 illustrates a more detailed cross-sectional view of one of the capacitors 110 shown in FIG. 1. Each capacitor comprises one or more layers of dielectric material. FIG. 2 shows a capacitor comprising multiple layers of dielectric material 270, 271 separated by internal electrodes 280, 281. Each internal electrode 280, 281 of each individual capacitor 110 is in electrical contact with the respective first 115 and/or the second external electrode 117. Thus, each internal electrode 280, 281 is in electrical contact with at least one of the first plate 125 and the second plate 127 shown in FIG. 1. FIG. 2 shows first external electrodes 115 in electrical contact with first internal 280 electrodes and second external electrodes 117 in electrical contact with second internal electrodes 281. As shown in FIG. 2, the capacitors are arranged such that that the internal electrodes 280, 281 are perpendicular to the electrode plates 125, 127 of FIG. 1. The electrode material may have a higher thermal conductivity than the dielectric material. The arrangement shown in FIG. 2 increases the effective thermal conductance of the capacitors in the direction perpendicular to the electrode plates (the Z direction).

Figure 3A:
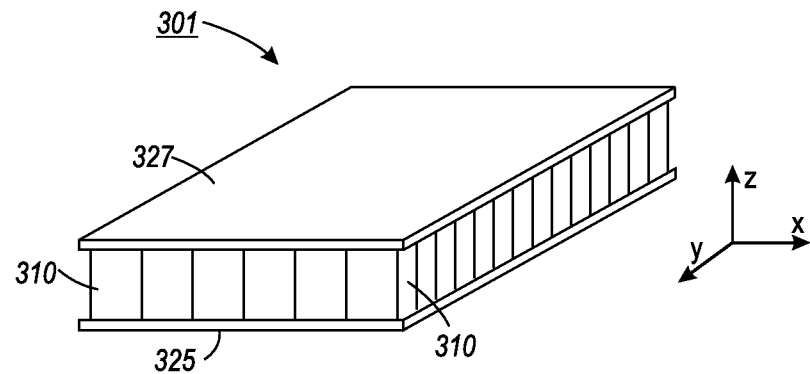
FIGS. 3A-3C show examples of capacitor devices having multiple dimensions in accordance with various aspects.
Figure 3B:
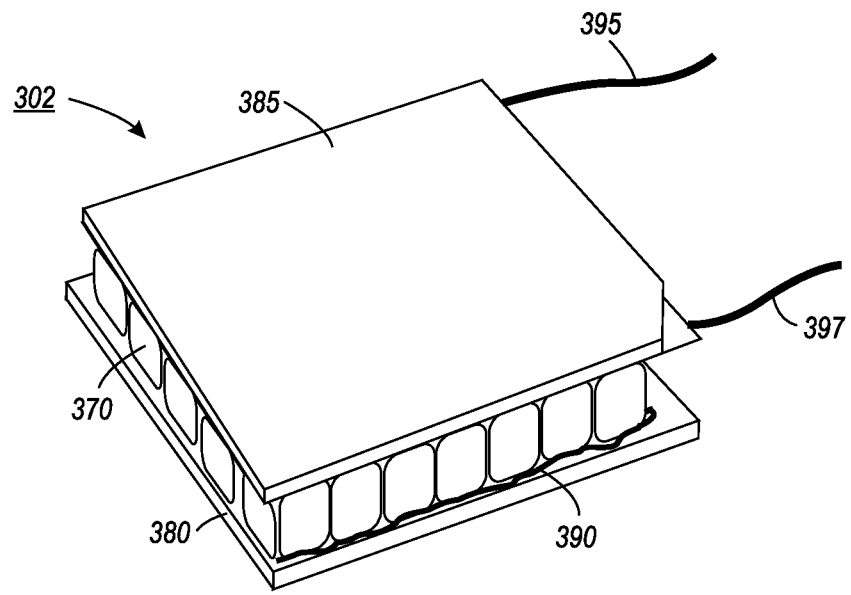
Figure 3C:
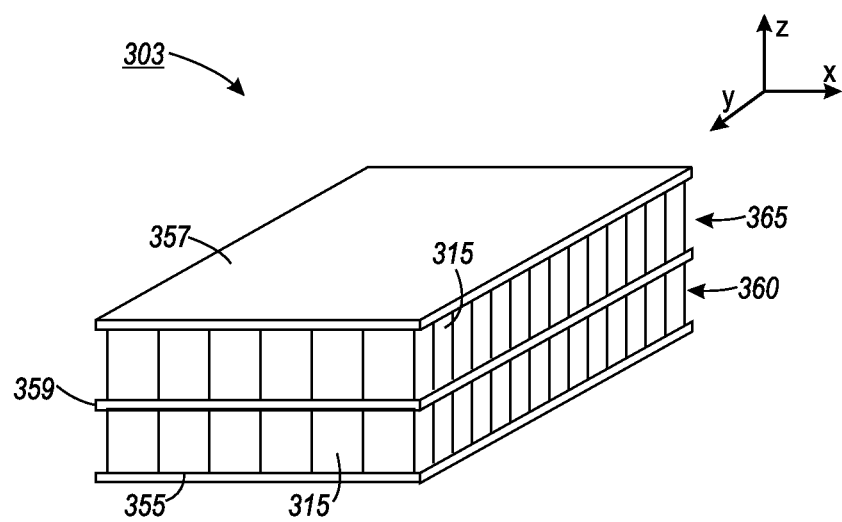

While FIG. 1 illustrates a one-dimensional arrangement of capacitors (e.g., capacitors arranged in a line along the x axis), the arrangement can alternatively be two or three dimensional. FIGS. 3A-3C show examples of capacitor devices 301, 302, 303 arranged in multiple dimensions. According to various implementations, the array of capacitors is arranged into a shape. For example, the array of capacitors is arranged into a two-dimensional circular shape, a wedge shape, an elliptical shape and/or a rectangular shape. The specific shape may depend on the application. For example, the array of capacitors may be arranged into a shape that is configured to reduce a thermal mass of the device.

FIG. 3A shows a capacitor device 301 comprising a two-dimensional array of capacitors 310 having a two dimensional rectangular shape, e.g., a rectangular solid shape. The capacitors 310 are electrically connected and/or mechanically secured to plates 325 and 327. As previously discussed in connection with FIG. 1, each of the capacitors 310 can be electrically connected in parallel and/or in series and the electrically connected capacitor arrangement can act as a single capacitor device. In implementations in which the capacitors 310 are electrically connected in parallel, the capacitor device 301 acts as a single capacitor with the plates 325, 327 acting as the two device electrodes of the capacitor device 301.

FIG. 3B illustrates another capacitor device 302 comprising a two dimensional capacitor array having first 380 and second 385 plates sandwiching multiple capacitors 370. The capacitors 370 are electrically connected and/or mechanically attached to the plates 380, 385 with a solder layer 390. The conductive coatings on the first plate 380 and the second plate 385 are electrically coupled to respective first and second wires 395, 397.

The capacitor modules described herein may have dimensions of about 9.6 mm×1.1 mm×3.7 mm using twenty standard packaged capacitors, for example. Standard individual capacitor dimensions may be 1.9 mm×2.6 mm×3.3 mm. According to various implementations, standard-packaged capacitors such as standard metric surface mount package capacitors 0402 (0.4 mm length×0.2 mm width), 0603 (0.6 mm length×0.3 mm width), or 2012 (2.0 mm length×1.25 mm width) can be used as the individual capacitors in the capacitor device. In some implementations, the standard packaged capacitors can be used to form an electrocaloric capacitor that can satisfy the volume, power, and geometry requirements of an electrocaloric cooling or heat pump system.

FIG. 3C shows a capacitor device 303 comprising a three dimensional array of capacitors 315. In this example, there are two layers of capacitors 360, 365. The capacitor arrangement includes a first plate 355 and a second plate 357. A third plate 359 separates the first layer of capacitors 360 from the second layer of capacitors 365. In some cases, the third plate is electrically connected to at least one of the first layer of capacitors 360 and the second layer of capacitors 365. As one example, capacitors 315 are electrically connected in series and parallel in the capacitor device 303 with plates 357 and 355 serving as the plates of the capacitor device 303. In another example, capacitors 315 are electrically connected in parallel in the capacitor device 303, with plates 355 and 357 shorted together and plates 359 and 357 (or 355) serving as the plates of the capacitor device 303.

Figure 4A:
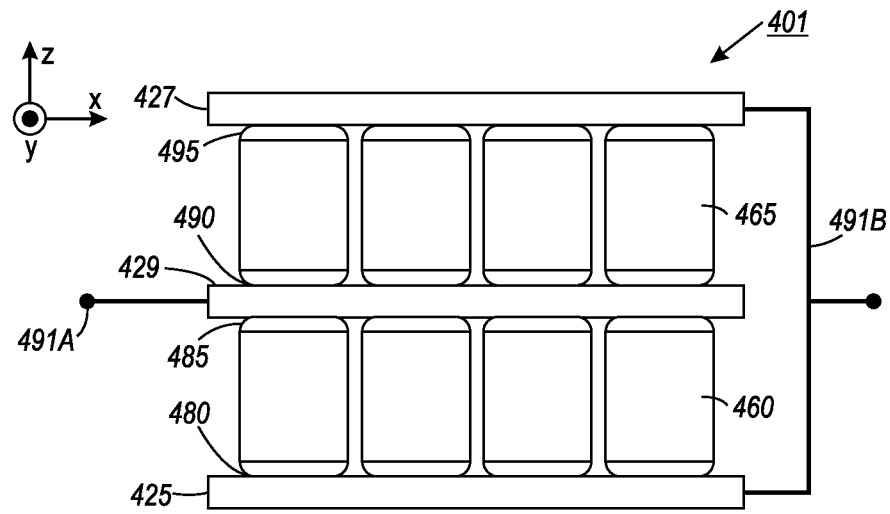
FIGS. 4A-4C illustrate views of a capacitor device having a second layer of multi-layer capacitors according to some implementations.
Figure 4B:
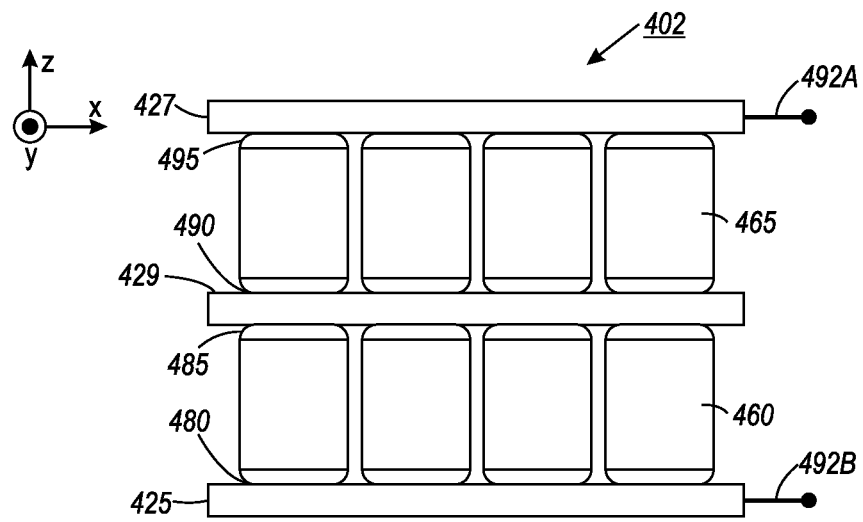
Figure 4C:
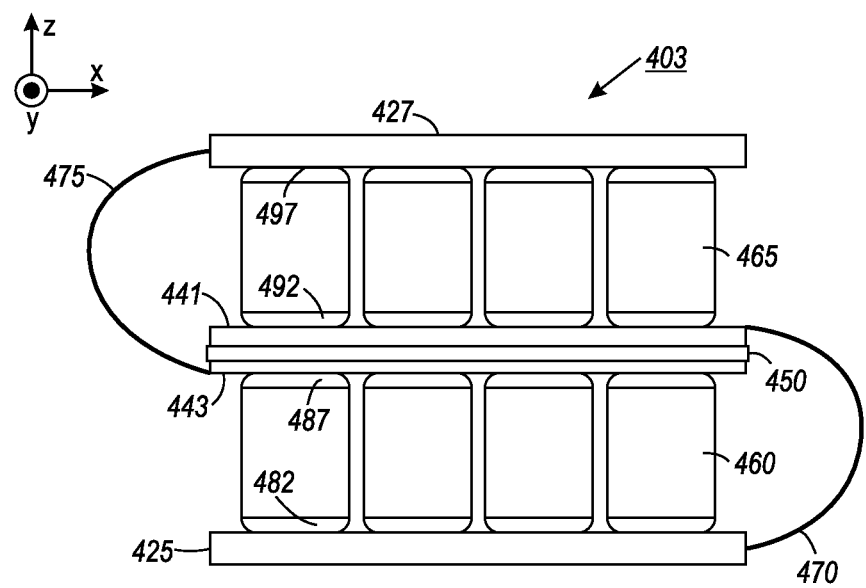

FIGS. 4A through 4C illustrate more detailed views of capacitor devices 401, 402 having a second layer of multi-layer capacitors. FIG. 4A shows a capacitor device 401 having a first layer of capacitors 460 and a second layer of capacitors 465. The first external electrodes 480 of the first layer of capacitors 460 are electrically connected and/or mechanically attached to a first plate 425 in accordance with processes described herein. The second external electrodes 485 of the first layer of capacitors 460 are electrically connected and/or mechanically attached to the third plate 429. The first external electrodes 490 of the second layer of capacitors 465 are electrically connected and/or mechanically attached to the third plate 429. The second external electrodes 495 of the second layer of capacitors 465 are electrically connected and/or mechanically attached to the second plate 427. In this arrangement each of the capacitors 460 of the first layer are electrically connected in parallel between the second plate 427 and the third plate 429. Each of the capacitors 465 of the second layer are electrically connected in parallel between plates the first plate 425 and the third plate 429. Electrical connector 491b electrically connects the first and second plates 425, 427. The first layer of capacitors 460 is connected in parallel with the second layer of capacitors 465 between electrical connector 491a and 491b.

FIG. 4B shows an example of a capacitor device 402 in which the capacitors 460 of the first layer are connected in parallel with each other, the capacitors 465 of the second layer are connected in parallel with each other and the capacitors 460 of the first layer are connected in series with the capacitors 465 of the second layer between electrical connectors 492a and 492b.

FIG. 4C shows another example of a capacitor device 403 wherein the capacitors 460 of the first layer are connected in parallel with each other, the capacitors 465 of the second layer are connected in parallel with each other and the capacitors 460 of the first layer are connected in series with the capacitors 465 of the second layer.

In this embodiment, the third plate 443 includes an insulating layer 450 that prevents the second device electrodes from the first layer of capacitors 460 from being in electrical contact with the first device electrodes of the second layer of capacitors 465. A first electrical connector 470 electrically connects the first plate 425 (which is electrically connected with the first external electrodes 482 of the first layer of capacitors 460) with the portion of the third plate 441 that is electrically connected with the first external electrodes 492 of the second layer of capacitors 465. Similarly, a second electrical connector 475 electrically connects the second plate 427 (which is electrically connected with the second electrodes 497 of the second layer of capacitors 465) with the portion of the third plate 443 that is electrically connected with the second electrodes 487 of the first layer of capacitors 460. This configuration allows the first plate to act as a first device electrode and the second plate to act as a second device electrode of the capacitor device 403 in which all the capacitors 460, 465 are electrically connected in parallel. In some implementations, the capacitor device may have more than two layers.

Figure 5A:
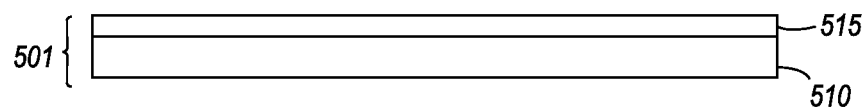
FIGS. 5A-5E illustrate a process for creating capacitor devices in accordance with embodiments described herein.

FIGS. 5A-5E illustrate a process for creating an arrangement of capacitor devices in accordance with embodiments described herein. A first electrode plate 501 for a capacitor device includes a substrate 510 and may include one or more additional layers. According to various embodiments, the substrate 510 comprises a thin and/or substantially flat silicon chip. The silicon chip may be about 1.2 cm by 1.2 cm, for example. The silicon chip may have the same or similar thickness of the plates (e.g., 200 µm). In some cases, the substrate 510 is coated with at least one electrically conductive layer 515 of metal and/or other conductive material as shown in FIG. 5A. In most cases, the conductive layer 515 is coated on a surface of the substrate 510 that will face the capacitors. In embodiments where the substrate itself is electrically conductive, the conductive layer may not be needed. A single layer or multiple layers of metal and/or conductive other material may be coated on the substrate 510 using any suitable material. The layer 515 may coat the entire substrate in some implementations. The layer 515 may be coated using a deposition technique such as chemical vapor deposition (CVD), physical vapor deposition (PVD), painting, thermal spray, evaporation, sputtering, and plating. In some examples, the conductive layer may be patterned to facilitate various connections between the capacitors.

Layer 515 may be or comprise a conductive metal suitable for providing electrical contact between the capacitors and the plate, e.g., the layer 515 may be or comprise Ti, Cu, and/or Au. In some embodiments, multiple different materials, e.g., different metals, may be used. In some embodiments, a thin layer of an adhesion metal (e.g. Cr, Ti) may be used below a thicker metal layer such that the adhesion layer is disposed between the thicker metal layer and the substrate and contributes to adhesion of the thicker metal layer to the substrate. The thicker metal layer may comprise copper, nickel, gold, and/or aluminum, for example. According to various implementations, the first plate 501 is coated with the metal only if the substrate is not suitably conductive. For example, the metal may be disposed on the substrate if the substrate is not conductive and/or has a conductivity less than a specified value.

Figure 5B:
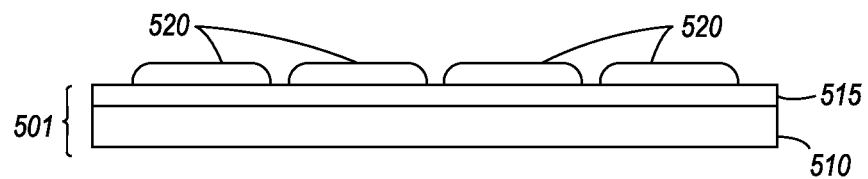

A solder paste and/or a thermally and/or electrically conductive adhesive (layer 520) may be applied to the conductive layer 515, or to the substrate if the substrate is sufficiently electrically conductive as shown in FIG. 5B. Additionally or alternatively, a layer of solder paste and/or other adhesive can be applied to one or more of the capacitors. The solder paste or adhesive layer 520 may be applied by dipping, brushing and/or stamping, for example.

In some cases, the adhesive comprises thermally and/or electrically conductive adhesive epoxy that is applied to the surface of the electrode plates and/or the capacitors. Types of electrically conductive epoxies may include epoxies that include Au and/or Ag, for example. Some types of polymers may also be used to mechanically and/or electrically connect the capacitors to the first and/or second plate. In some embodiments, an anisotropic conductive film may be used.

Figure 5C:
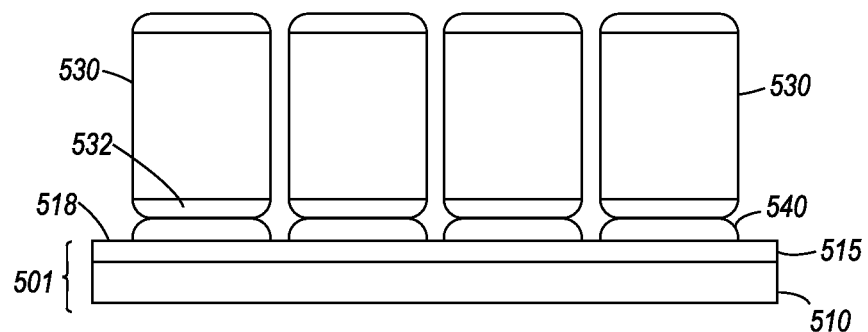

Capacitors are mechanically and/or electrically coupled to the first plate by soldering the capacitors to the plate having the solder paste disposed thereon and/or by adhering the capacitors to the plate via the conductive adhesive, or by another bonding process. As shown in FIG. 5C, capacitors 530 are arranged proximate the first plate 501 so that first external electrodes 532 of the multi-layer capacitors 530 face the surface 518 of the first plate 501. The individual capacitors may be placed manually or automatically on the first plate or may be placed through a combination of manual and automatic placement. For example, in some embodiments the capacitors may be placed with pick-and-place, a sieve, or any suitable technology to form an array of the capacitors on the plate. In some cases, the capacitors are tightly packed such that there is substantially no space between the individual capacitors. In some cases, the capacitors are arranged on the plate to have a space between them. Having space between the capacitors may facilitate air flow and increase cooling, but may increase the size, for example.

Figure 5D:
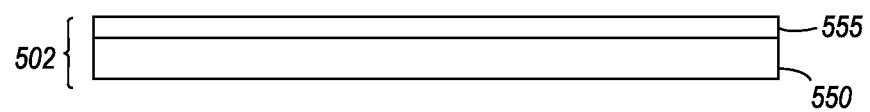

A solder reflow process may be used to solder the capacitors to the first plate. FIG. 5D illustrates the capacitors 530 electrically and mechanically connected to the first plate 501 after the reflow process. The reflowed solder 540 provides the mechanical and electrical connection between the capacitors 530 and the plates 501. The solder forms a thin, thermally conductive layer. In cases where an adhesive is used, a curing process may occur instead of, or in addition to, the solder reflow process.

Figure 5E:
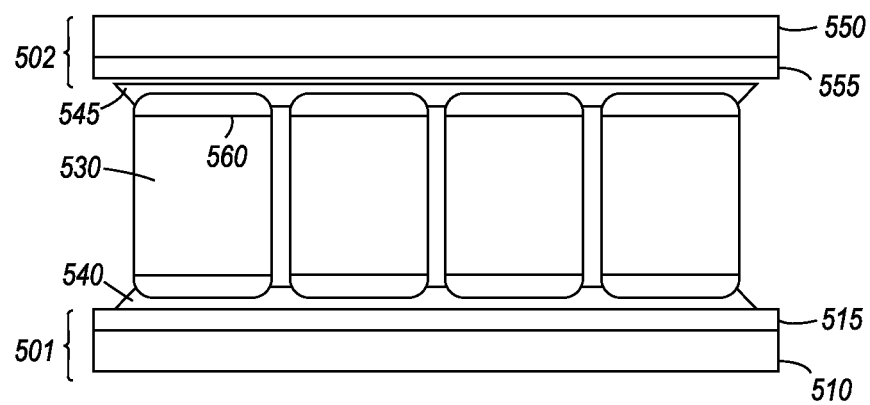

The process shown in FIGS. 5A-5C may be repeated to fabricate and position the second plate 502 as shown in FIGS. 5D and 5E. FIG. 5D shows the second plate 502 comprising a substrate 550 with a solder paste and/or adhesive layer 555 disposed thereon. The second plate 502 may be substantially identical in size and/or shape as the first plate 501 and/or may be a different size and/or shape. The second plate 502 may comprise the same materials or different materials from the materials of the first plate 501.

After the second plate 502 is positioned proximate the second external electrodes 560 of the capacitors 530, another solder reflow process occurs, e.g., similar to the reflow process used for the first plate. In some cases, the second plate 502 is arranged proximate the second external electrodes 560 before the solder reflow process for either of the first and second plates takes place. The reflow process for both the first plate 501 and the second plate 502 may occur at substantially the same time.

Figure 6A:
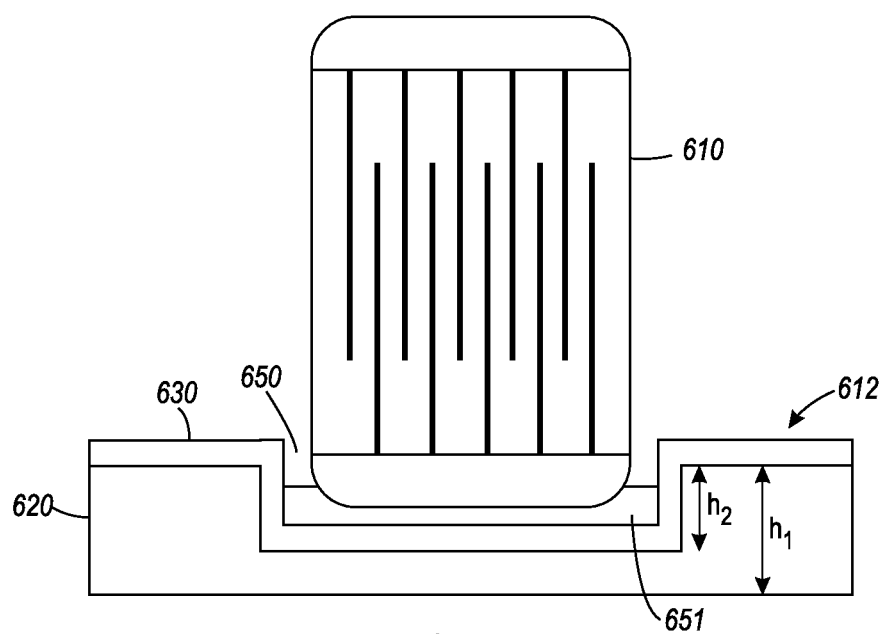
FIGS. 6A-6C show a plate having a conductive layer and a cavity for holding at least one capacitor according to some implementations.
Figure 6B:
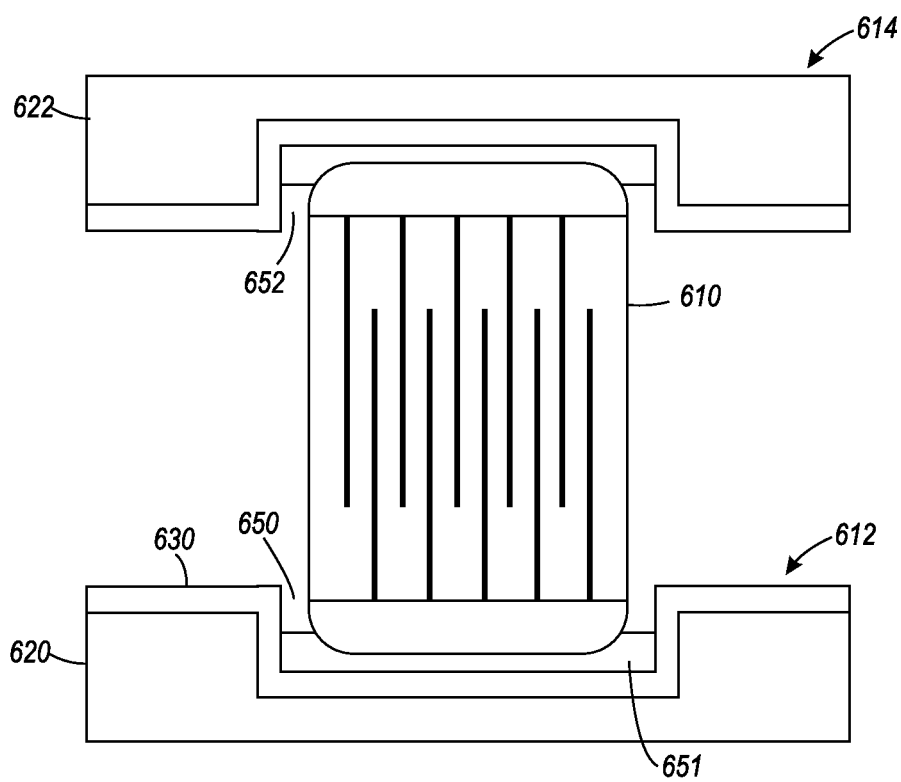

According to various implementations, the first plate and/or the second plate can include patterning that assists in reducing the thermal mass and/or in positioning the capacitors on the plates. For example, the first and or the second plate can include a cavity for placing one or more of the capacitors. FIGS. 6A and 6B show a plate 620 having a conductive layer 630 and a cavity 650 for holding at least one capacitor 610. The capacitor 610 is coupled to the plate by a layer of solder or conductive adhesive 651. Placing the capacitors 610 in cavities may increase the contact surface area between the capacitors 610 and the plates 620. This can improve thermal contact between the capacitors 610 and the plates 620. The removal of material from the electrode plate 612 to form the cavity 650 can reduce the non-active thermal mass of the arrangement. In some configurations, the plate 620 of FIG. 6A has a first height $h_1$, e.g. 200 µm. The cavity 650 has a second height $h_2$, e.g., 100 µm. For example, the ratio of the height of the cavity to the height of the plate, $h_2:h_1$ can be 1:2, 1:3, or 1:4 for example. In some cases, the difference in heights between the plate and the cavity is increased or decreased from the example illustrated in FIG. 6A.

While only one plate, e.g., the first plate, as shown in FIG. 6A may have a cavity, in various configurations, both the first plate and the second plate have a cavity as shown in FIG. 6B. FIG. 6B shows the second plate 622 having a cavity 652. The cavity 652 of the second plate 622 may have substantially the same height as the cavity 650 in the first plate 620 or may have a different height.

Figure 6C:
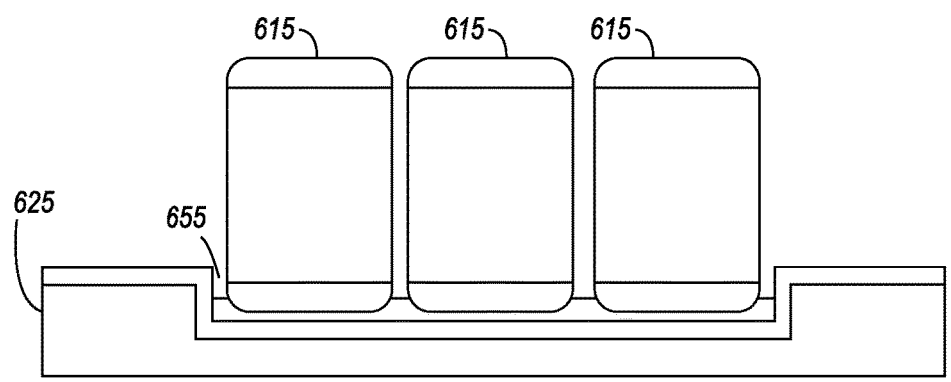

In some cases, the cavity is configured to hold more than one individual capacitor. FIG. 6C shows an example in which the cavity 655 is configured to hold multiple capacitors 615. The cavity may be configured to hold a portion of the capacitors that make up the arrangement or may be configured to hold all of the capacitors in the capacitor arrangement. Additionally or alternatively, the capacitors may be aligned using rods and/or pins that are affixed to one or more of the plates. Alternatively, a different means for aligning the capacitors may be used, for example rods or pins affixed to one or more of the plates.

Figure 7:
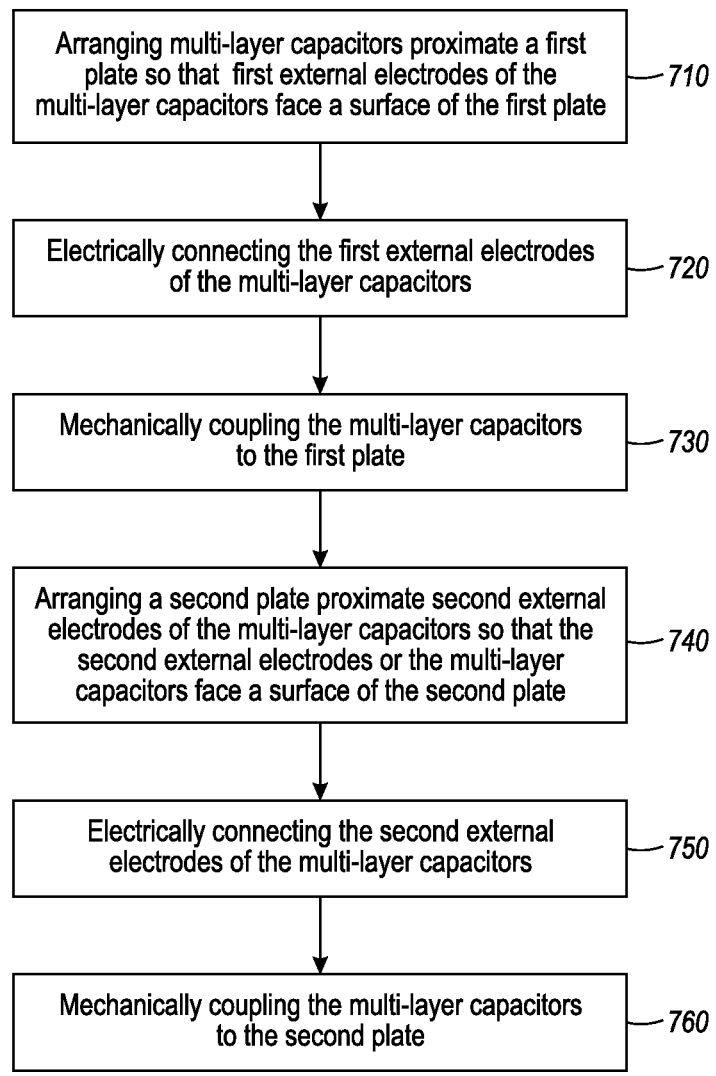
FIG. 7 illustrates a process for making a multilayer capacitor device in accordance with embodiments described herein.

FIG. 7 illustrates a process for making a multilayer capacitor arrangement in accordance with embodiments described herein. Multi-layer capacitors are arranged 710 proximate a first plate so that first external electrodes of the capacitors face a surface of the first plate. The first external electrodes of the multi-layer capacitors are electrically connected 720 to the first external electrodes of the capacitors. The capacitors are mechanically coupled 730 to the first plate. A second plate is arranged 740 proximate second external electrodes of the capacitors so that the second external electrodes of the capacitors face a surface of the second plate. The second external electrodes of the capacitors are electrically connected 750 to the second plate. The capacitors are mechanically coupled 760 to the second plate. Electrically connecting the first external electrodes of the capacitors and mechanically coupling the multi-layer capacitors to the first plate and/or the second plate may include soldering the first external electrodes to the first plate and/or attaching the first external electrodes to the first plate using an electrically conductive adhesive.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A capacitor device, comprising:
   a plurality of capacitors comprising an electrocaloric dielectric, the plurality of capacitors arranged into a shape, each capacitor of the plurality of capacitors having a first external electrode on a first side of the capacitor, a second external electrode on a second side of the capacitor opposing the first side and at least one internal electrode electrically connected to at least one of the first external electrode and the second external electrode;
   a first plate proximate and electrically coupled to the first external electrodes of the capacitors; and a second plate proximate and electrically coupled to the second external electrodes of the capacitors, wherein the at least one internal electrode is perpendicular to the first electrode plate and the second electrode plate, wherein the first and second plates have a thermal conductivity greater than 10 W/m-K, wherein each of the first plate and the second plate comprises:
a substrate comprising one of a semiconducting material and an insulating material, the substrate having a first side facing towards the first and second external electrodes and a second side facing away from the first and second external electrodes; and
a metal layer disposed on the first side of the substrate.

2. The device of claim 1, wherein at least some of the plurality of capacitors are connected in parallel.

3. The device of claim 1, wherein the first plate is a first device electrode of the capacitor device and the second plate is a second device electrode of the capacitor device.

4. The device of claim 1, further comprising:
a first electrically conductive wire electrically coupled to the first plate; and
a second electrically conductive wire electrically coupled to the second plate, the first and second wires suitable for connecting the capacitor device to an electrical circuit.

5. The device of claim 1, wherein at least one of the first and second plates comprises at least one cavity for holding the plurality of capacitors.

6. The device of claim 1, wherein the capacitors are multi-layer capacitors.

7. The device of claim 1, wherein the electrocaloric dielectric comprises at least one of $BaTiO_3$, PLZT, and $PbBaZrO_3$.

8. The device of claim 1, wherein the shape is one of a rectangular shape, a circular shape, a wedge shape, and an elliptical shape.

9. The device of claim 1, wherein:
the first plate is secured to the first external electrodes by a first adhesive layer; and
the second plate is secured to the second external electrodes by a second adhesive layer.

10. The device of claim 9, wherein at least one of the first and second adhesive layer is an electrically conductive epoxy.

11. The device of claim 1, wherein the first plate is soldered to the first external electrodes and the second plate is soldered to the second external electrodes.

12. The device of claim 1, wherein at least one of the first plate and the second plate comprises metal.

13. The device of claim 1, wherein each of the capacitors has dimensions of a standard 0402, 0603, or 1206 surface mount package.

14. The device of claim 1, wherein the capacitors are arranged in a 1 dimensional array.

15. The device of claim 1, wherein the capacitors are arranged in a 2 dimensional array.

16. The device of claim 1, wherein:
the capacitors are arranged in a 3 dimensional array; and
further comprising a third plate disposed between capacitors arranged along one of the axes of the 3 dimensional array.

17. The device of claim 1, wherein the substrate comprises silicon.

18. The device of claim 1, wherein the substrate comprises alumina.

19. A method, comprising:
arranging electrocaloric capacitors proximate a first plate so that first external electrodes of the electrocaloric capacitors face a surface of the first plate;
electrically connecting the first external electrodes of the electrocaloric capacitors and mechanically coupling the electrocaloric capacitors to the first plate;
arranging a second plate proximate second external electrodes of the electrocaloric capacitors so that the second external electrodes of the electrocaloric capacitors face a surface of the second plate;
electrically connecting at least one internal electrode to at least one of the first external electrode and the second external electrode; and
electrically connecting the second external electrodes of the electrocaloric capacitors and mechanically coupling the electrocaloric capacitors to the second plate, wherein the at least one internal electrode is perpendicular to the first electrode plate and the second electrode plate, wherein the first and second plates have a thermal conductivity greater than 10 W/m-K, wherein each of the first plate and the second plate comprises:
a substrate comprising one of a semiconducting material and an insulating material, the substrate having a first side facing towards the first and second external electrodes and a second side facing away from the first and second external electrodes; and
a metal layer disposed on the first side of the substrate.

20. The method of claim 19, wherein electrically connecting the first external electrodes of the electrocaloric capacitors and mechanically coupling the electrocaloric capacitors to the first plate comprises soldering the first external electrodes to the first plate.

21. The method of claim 19, wherein electrically connecting the first external electrodes of the electrocaloric capacitors and mechanically coupling the electrocaloric capacitors to the first plate comprises attaching the first external electrodes to the first plate using an electrically conductive adhesive.

* * * * *